US008319361B2

(12) United States Patent
Lucks

(10) Patent No.: US 8,319,361 B2
(45) Date of Patent: Nov. 27, 2012

(54) COLLISION WARNING SYSTEM FOR A WIND ENERGY INSTALLATION

(76) Inventor: Christoph Lucks, Hamburg (DE)

(*) Notice: Subject to any disclaimer, the term of this patent is extended or adjusted under 35 U.S.C. 154(b) by 405 days.

(21) Appl. No.: 12/513,016

(22) PCT Filed: Nov. 7, 2007

(86) PCT No.: PCT/EP2007/061993
§ 371 (c)(1),
(2), (4) Date: Apr. 30, 2009

(87) PCT Pub. No.: WO2008/058876
PCT Pub. Date: May 22, 2008

(65) Prior Publication Data
US 2010/0084864 A1   Apr. 8, 2010

(30) Foreign Application Priority Data

Nov. 17, 2006   (DE) .................. 10 2006 054 667

(51) Int. Cl.
*H02P 9/04* (2006.01)
*F03D 9/00* (2006.01)
(52) U.S. Cl. ............... 290/44; 290/55; 416/23; 416/31; 416/32; 416/61
(58) Field of Classification Search ............ 290/44, 290/55; 416/23, 31, 32, 61; *H02P 9/04; F03D 9/00*
See application file for complete search history.

(56) References Cited

U.S. PATENT DOCUMENTS

| | | | | |
|---|---|---|---|---|
| 3,515,485 A | * | 6/1970 | Frank | 356/141.2 |
| 5,315,159 A | * | 5/1994 | Gribnau | 290/55 |
| 6,876,099 B2 | * | 4/2005 | Wobben | 290/44 |
| 7,246,991 B2 | * | 7/2007 | Bosche | 415/14 |
| 7,967,564 B1 | * | 6/2011 | Andersen et al. | 416/1 |
| 2003/0102675 A1 | * | 6/2003 | Noethlichs | 290/44 |
| 2003/0127862 A1 | | 7/2003 | Weitkamp | |
| 2004/0057828 A1 | * | 3/2004 | Bosche | 416/1 |
| 2004/0108732 A1 | * | 6/2004 | Weitkamp | 290/55 |
| 2004/0174542 A1 | * | 9/2004 | Handman et al. | 356/622 |
| 2007/0018457 A1 | * | 1/2007 | Llorente Gonzalez | 290/44 |
| 2007/0290506 A1 | * | 12/2007 | Walling | 290/44 |
| 2008/0084068 A1 | * | 4/2008 | Shibata et al. | 290/44 |
| 2008/0101930 A1 | * | 5/2008 | Bosche | 416/31 |
| 2010/0084864 A1 | * | 4/2010 | Lucks | 290/44 |

FOREIGN PATENT DOCUMENTS

| | | |
|---|---|---|
| DE | 10032314 | 12/2001 |
| EP | 0995904 | 4/2000 |
| EP | 1772662 | 4/2007 |
| NL | 1018670 | 2/2003 |
| WO | WO01/33075 | 5/2001 |
| WO | WO2007/104306 | 9/2007 |

\* cited by examiner

*Primary Examiner* — John K Kim
(74) *Attorney, Agent, or Firm* — Sand & Sebolt

(57) ABSTRACT

The invention relates to a device for monitoring a wind energy installation (1) comprising a tower (2) and a rotor provided with rotor blades (5) and arranged on the tower, in terms of a possible collision of a rotor blade (5) with the tower (2). Said device comprises at least one distance sensor (7a, 7b) which is arranged on the wind energy installation (1) and used for the non-contact measurement of the distance between the rotor blades (5) and a pre-determined point on the wind energy installation (1). The device also comprises an electronic evaluation system in which the distance data measured by the at least one distance sensor (7a, 7b) is evaluated, said system emitting a collision warning in the event of a critical distance not being reached.

14 Claims, 1 Drawing Sheet

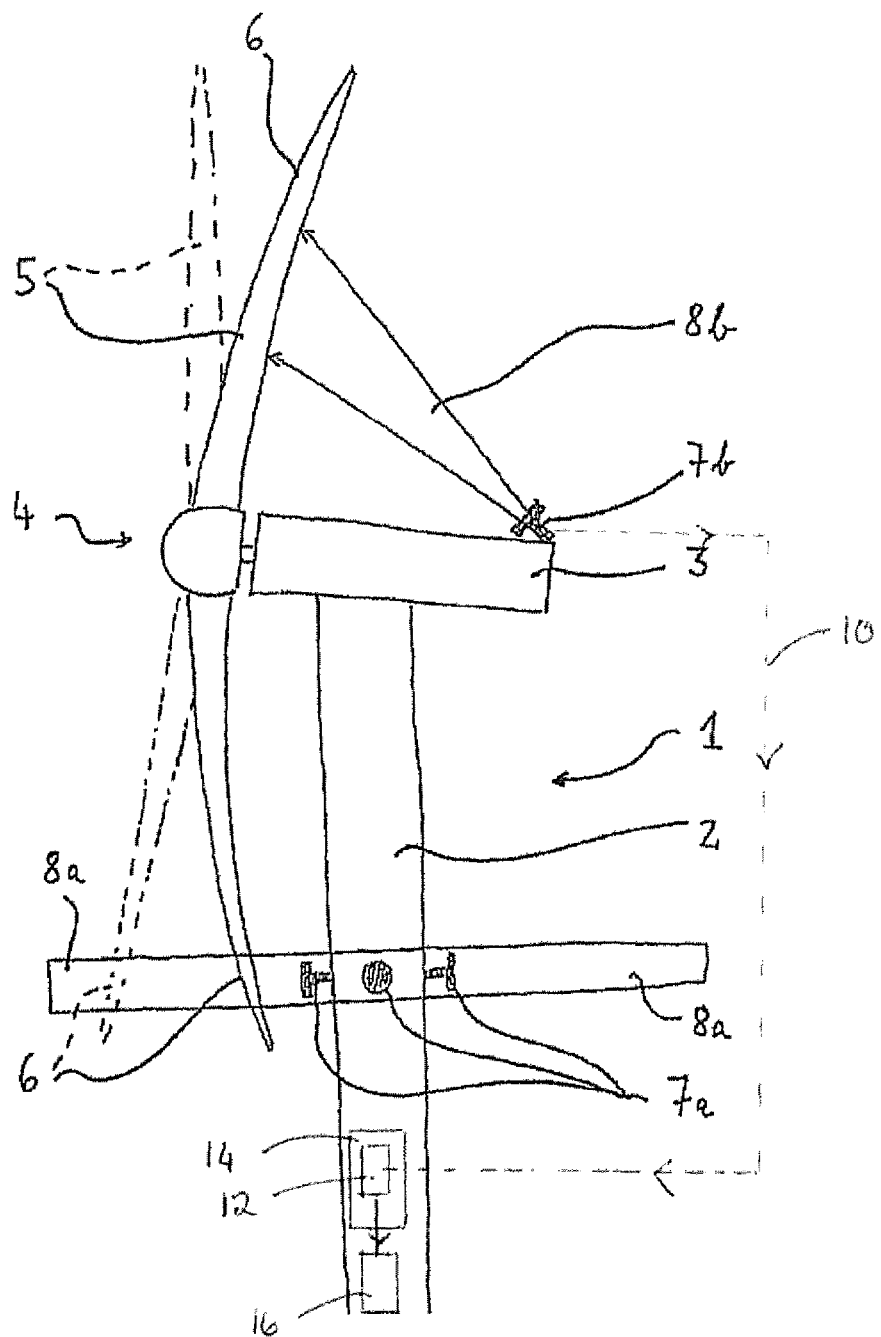

COLLISION WARNING SYSTEM FOR A WIND ENERGY INSTALLATION

TECHNICAL BACKGROUND

The invention relates to a method and a device for monitoring a wind energy installation comprising a tower and a rotor provided with rotor blades and arranged on the tower, with respect to a potential collision of a rotor blade with the tower.

PRIOR ART

The vast majority of rotor blades used in wind energy installations are made of fiber-reinforced plastics. Structural components constructed from fiber-reinforced plastics characteristically have a varied arrangement and orientation of the fibers in the individual sections of the blade body. Various fibers such as glass and coal fibers may also be combined with one another and constructed as solid or as sandwich laminates. Thus rotor blades of wind energy installations have a complex and asymmetrical structure.

The job of a rotor is to convert the kinetic energy of the air mass that is moved into usable torque. This must be accomplished safely, in other words without coming into contact with the tower, over the entire design period of the wind energy installation, or typically 20 years. The Germanischer Lloyd regulations for the certification of wind energy installations, Chapter 6, entitled "Structures" 6.2.4.1, compliance plans (7) and (8), describe the required minimum distance between the rotor blade and the tower for all load cases as follows: The reference distance is the distance between the rotor blade and the tower in the unloaded state. At no time may a rotor blade of the rotating rotor drop below a minimum distance of 30% of this distance in the unloaded state.

During operation, the blade structure is dynamically stressed by its own weight and by the wind; its outer shell is exposed to the weather; and the laminates can absorb moisture.

Rotor blades are customarily configured such that all operating loads, including the maximum loads of a strong wind gust, can be safely accommodated over a design period of 20 years. The fact that laminates are altered by continuous loads and that all material properties are accordingly time-dependent is countered by safety factors incorporated into the design of the blades. In other words, the rotor blades are customarily dimensioned so as to be capable of accommodating all load levels even after 20 years.

The fatigue strength of the rotor blades and their strength under maximum loads is influenced by the actual operating loads (inclined air flow, edgewise vibrations, stall effects, and so forth), but also by boundary conditions encountered in production, and damage caused by external factors, such as a lightning strike, for example.

The gradual degradation of the material properties as a result of operation is the actual wearing of the rotor blade. It is known that the degradation of the material properties of fiber-reinforced plastics can be detected as a loss in rigidity and strength. These negative changes to the material properties have been proven in laboratory tests conducted on test pieces. It is also known that a change in rigidity is accompanied by a change in characteristic frequency and a change in bending characteristics. However, the extent to which knowledge gained from laboratory tests conducted on simple test pieces—unidirectional fiber orientation with uniform fiber structure—can be applied to complex structures such as rotor blades of wind energy installations is not clearly ascertainable with the current level of knowledge.

In the testing methods currently in use, rotor blades are subjected to visual inspection at regularly spaced intervals. Blades are tapped, and characteristic frequencies are measured, for example. Alternatively, thermographic tests are conducted, or blades are imaged using x-ray or ultrasound imaging techniques. Common to all of these testing methods is that, although discrepancies can be detected, they cannot be assessed in terms of strength, so that a reliable conclusion regarding structural stability cannot be drawn.

Previous experience with the operation of wind energy installations in which collisions between blade and tower have occurred unexpectedly has shown that with a controlled operation of the rotor, structural stability is increased substantially and problems can be detected early on. A collision between the rotor and the tower during operation can result in serious damage or even a total failure of the entire installation.

From DE 10 2005 048 805 and from US 2004/0057828 the technique of stationarily attaching a single distance sensor to the tower is known.

With this solution, however, the deflection of the blade can be determined only in certain wind directions. Also known from US 2004/0057828 is the technique of equipping the rotors with strain gauges, however these are subject to severe drift.

PRESENTATION OF THE INVENTION

The object of this invention is therefore to propose a method and a device which will reliably detect a deflection of the rotor blades of the rotor of a wind energy installation during its entire period of operation, and which can detect any critical changes early on, thereby preventing further damage.

This object is attained with respect to the method by a method according to the characterizing features of Claim 1. Advantageous further improvements on the method are specified in the dependent Claims 2 through 7.

An attainment of this object with respect to the device is characterized in Claim 8, wherein advantageous embodiments of such a device are listed in Claims 9 through 14.

According to the invention, the detection of a deflection of the rotor blade by means of a contactless distance measurement is a suitable variable that will allow a conclusion to be drawn regarding the strength of the rotor and thus regarding the structural stability of the wind energy installation. For this purpose it is sufficient, in principle, to monitor a single point at the distal end of the rotor blade with respect to its distance from a predetermined reference point, which advantageously is the tower surface. More precise statements and predictions can be made by taking distance measurements at points distributed over the length of the rotor blade, for the purpose of identifying a "bending line."

According to the invention, the identification of the bending line of a rotor blade, or its deflection when loaded, is the proper variable required for drawing a conclusion regarding the strength of the rotor and thus the structural stability of the wind energy installation.

In this connection, for a reliable collision warning according to the invention it is crucial to monitor deflection continuously over the entire period of operation. If monitoring is possible only in certain wind directions, as in the prior art, a reliable warning of a collision is not ensured. With the arrangement of the invention, however, it is possible to monitor each rotor at very short intervals determined by the rotation of the rotors around their horizontal axes of rotation, and thereby to prevent a collision or to detect material fatigue.

In a simple embodiment of the method, a collision alarm is emitted only when critical distance values are reached, and can especially be transmitted to the operating system of the wind energy installation.

In an improved embodiment, load conditions are detected via the inclusion of operational data, such as wind speed, atmospheric density, temperature, wind direction, generated power, and so forth, for example (cf., Claim 6). In this case, a trend analysis of the operating behavior can be produced by comparing the rotor blade deflection with reference values. With this embodiment, statements regarding the projected remaining operating life span can be made, for example, and anomalies and critical load conditions can be detected.

Due to the complex structure of a rotor blade, although it is also possible to evaluate its material properties that are changed as a result of operation by measuring the changing characteristic frequencies, a direct statement regarding the residual strength of the measured rotor blade, and thus regarding the structural stability of the entire wind energy installation, cannot be definitely made. In contrast, by measuring the bending line of a rotor blade based upon the force acting upon it (e.g., actual wind load at nominal capacity, controlled introduction of force with stationary measurement) a definite statement can be made regarding the residual strength of the rotor and therefore regarding the structural stability of the entire wind energy installation.

The contactless distance measurement may be implemented, in principle, in any conceivable and technically feasible manner, with optical measuring methods (especially using a laser), ultrasound measurements or radar being especially preferred.

With respect to the arrangement of the sensor(s) of the invention, these can in principle be classified into two groups. The first group comprises those sensors that are carried along with rotations around the longitudinal axis of the tower, for example those that are arranged on the gondola; the second group comprises those arrangements in which a plurality of sensors are stationarily arranged, and distance is calculated based upon the measurements using geometric relationships.

Various options for arranging the distance sensors in the wind energy installation are listed by way of example in Claims 9 through 12.

One simple variant consists in stationarily arranging at least three sensors around the circumference of the tower, preferably at uniform angular distances. Because the rotor rotates around the longitudinal axis of the tower based upon changing wind directions, the rotor blades pass through the measuring ranges of the sensors at different positions. In the simplest case, the rotor blade passes by a distance sensor at a direct distance. In this case, the measured value from that distance sensor is sufficient to provide a distance determination. Usually, however, the rotor blade passes through the measuring range of two or more distance sensors "at an angle," so that the measured values from these sensors must then be evaluated in a correspondingly programmed electronic system using simple trigonometric calculations to determine an actual distance.

Alternatively, only one distance sensor may be provided on the tower, which then "rotates along" with the rotor, i.e., as the wind direction changes, the rotor position is tracked accordingly. This then always detects the correct distance between the distal end of the rotor blade and the tower. The sensor can be carried along via a mechanical coupling, or via electronic control.

In another variant, the distance sensors are arranged at the distal ends of the rotor blades. In this manner as well, the distance between the distal ends of the rotor blades and the tower of the wind energy installation can be easily determined. Additionally, the collected data can be easily allocated to a specific rotor blade, because each distance sensor is clearly linked to one rotor blade. Allocation of the measured data to a specific rotor blade is also possible in the other variants, however, in that, for example at the start of a series of measurements, a relationship between a specific rotor blade and a measured value is established, after which subsequent measured values are allocated cyclically to the subsequent rotor blades. In the case of optical distance measurement it is also possible for the rotor blades to be equipped with various optical markings, which are detected along with the distance measurement and are assessed to allow identification of a specific rotor blade.

Finally, a distance sensor may be arranged on the gondola, with the measuring range of said sensor "facing upward," specifically in an area in which the distal ends of the rotor blades pass through the vertical axis. This arrangement has the advantage that the effect of tower dam on the deflection of the rotor blade is disregarded; nevertheless, this arrangement is more costly and ultimately offers a lower level of safety, as a potential collision cannot be reliably detected in every case.

The distance sensors can especially be connected to the electronic evaluation system via wireless data connections.

BRIEF DESCRIPTION OF THE DIAGRAMS IN THE SET OF DRAWINGS

Further advantages and characterizing features of the invention are found in the following description of an exemplary embodiment, with reference to the attached FIGURE. The FIGURE shows:

FIG. 1: a schematic illustration of a wind energy installation with a collision warning system according to the invention.

WAY(S) OF CONFIGURING THE INVENTION

In the sole FIGURE, a wind energy installation is illustrated schematically, and is generally identified as 1. The wind energy installation 1 has a tower 2, at the upper end of which a gondola 3 is arranged so as to be capable of rotating around the longitudinal axis of the tower 2. A rotor 4 with rotor blades 5 is attached to the gondola 3. The blades are driven by wind pressure, causing the rotor 4 to rotate in relation to the gondola 3, thereby driving a shaft, which is attached to the rotor, the rotational energy from which is converted to electrical energy inside the wind energy installation 1 in a known manner.

In the FIGURE, a wind energy installation 1 comprising a rotor 4 with two rotor blades 5 is schematically illustrated, however the invention is not limited to a wind energy installation of this type. It may especially also be used with systems comprising rotors having three or more rotor blades, such as are currently customarily used.

In the FIGURE, dashed lines indicate the rotor blades 5 in a neutral position, i.e., without active wind load. During operation, wind pressure stresses the rotor blades 5, dependent upon wind speed, such that the blades become deflected under this load, and move to the position indicated by solid lines.

During operation, a gradual degradation of the material properties of the rotor blades 5 occurs. In other words, a rotor blade 5 gradually loses its strength, and will deflect to an increasing degree under equal loads. This is taken into consideration in the design; rotor blades 5 that are manufactured and operated according to specifications should maintain adequate strength over the entire lifespan of the installation, typically 20 years.

A loss of deflective strength as a result of the above-described factors is evidenced by a change in the bending line 5 and the deflection of the rotor blades 5.

The collision critical area is the area around the tower 2 that lies at the height of the outer circular path of the rotor blades 5. In the illustrated embodiment, this area is monitored according to the invention using distance sensors 7a, which operate without contact, in their measuring areas 8a. If critical distance values are not reached, a signal 10 is transmitted to an electronic evaluation system 12 contained in an operation control system 14 of the wind energy installation 1. Alternatively or additionally, a distance sensor 7b, also represented in the FIGURE, may also be arranged on the gondola 3 for the purpose of monitoring the position of the distal ends 6 of the rotor blades 5 when said blades are in a vertical position above the gondola 3. This distance sensor 7b can have a measuring range 8b. Other alternatives for the arrangement of the distance sensors are listed in the preceding general description, wherein these alternative arrangements can be optionally used separately, interchangeably, or in any combination.

In one simple variant, only an imminent collision of a rotor blade 5 with the tower 2 is monitored by the system of the invention, wherein if the distal end 6 of the rotor blade 5 fails to reach a minimum distance, this is evaluated as an imminent collision. An alarm is then sent to the operating system 14 via the electronic evaluation system 12. The electronic evaluation system 12 is connected to an emergency shut-off system 16. When the alarm is sent to the operating system 14, the operating system can especially perform an emergency shut-off of the wind energy installation 1 and can optionally send a message to a service site.

In another variant, the distance data are evaluated under consideration of other data, such as wind speed, current output (load), temperature, etc., which are currently customarily recorded anyway, in order to generate a wear curve for the rotor blade 5, so that conclusions may be drawn regarding the remaining lifespan of the rotor blade. In this manner, early warnings can be generated, for example, which indicate the future need for a replacement of the affected rotor blade early enough that the operator of the wind energy installation 1 can plan ahead for a necessary replacement of the rotor blade 5.

The advantages of the invention and their advantageous variants are summarized as follows:
- Contactless measurement of the bending line and the deflection of the rotor during operation of the system;
- Early warning of a collision;
- Detection of anomalies, and thereby increase in structural stability;
- Autonomous operation, manufacturer's data, or access to system data not necessary—application of GL regulation, measurement of tower distance in unloaded state;
- With system networking and exchange with system data, suitable as Condition Monitoring System;
- Network independent operation possible via energy supply with PV system;
- Simple assembly with wireless data transmission.

List Of Reference Symbols

1 Wind energy installation
2 Tower
3 Gondola
4 Rotor
5 Rotor blade
6 Distal end
7a, 7b Distance sensor
8a, 8b Measuring range

The invention claimed is:

1. A method of monitoring a wind energy installation which comprises:
a tower; a gondola provided on the tower and being rotatable around a longitudinal axis of the tower; a rotor attached to the gondola, said rotor being provided with at least one rotor blade, and wherein the rotor is rotatable about a horizontal axis of the gondola; a distance sensor positioned on the gondola, wherein the distance sensor is oriented toward a point at which a distal end of the rotor blade passes through a vertical axis; and wherein the method of monitoring is with respect to a possible collision of the rotor blade with the tower, wherein during operation, a deflection of the rotor blade is measured by means of a contactless distance measurement taken by the distance sensor and, if the deflection exceeds a predetermined critical measurement, a collision warning is emitted, wherein the position of the sensor on the gondola is chosen such that the deflection of the rotor blade is determinable at every possible rotational position of the gondola during rotation of the gondola around the longitudinal axis of the tower.

2. The method according to claim 1, wherein the distance between the distal end of the rotor blade and the tower is determined using the contactless distance measurement taken by the distance sensor on the gondola.

3. The method according to claim 1, wherein a percentage of the amount by which the rotor blade fails to reach a reference distance, which was previously recorded by means of the contactless distance measurement when the rotor was under load-free conditions, is used to establish the predetermined critical measurement that is decisive for emitting the collision warning.

4. The method according to claim 1, wherein the contactless distance measurement is taken optically.

5. The method according to claim 1 wherein the contactless distance measurement is taken using ultrasound distance measurement methods.

6. The method according to claim 1 wherein the contactless distance measurement is taken using radar distance measurement methods.

7. The method according to claim 1, wherein to analyze the degree of aging the rotor blade, data regarding current wind speed and current system output, are taken into consideration along with the distance determined by means of the contactless distance measurement.

8. A device for monitoring a wind energy installation, which comprises:
a tower;
a gondola arranged on the tower such that it is rotatable around a longitudinal axis of the tower;
a rotor supported by the gondola, said rotor being provided with at least one rotor blade;
at least one distance sensor arranged on the gondola and oriented toward a point at which a distal end of the rotor blade passes through a vertical axis; said distance sensor being configured to take a contactless measurement of the distance between the rotor blade and a predetermined point on the wind energy installation; and
an electronic evaluation system operationally engaged with the wind energy installation and in which the distance data measured by the at least one distance sensor are evaluated, and which, if a predetermined minimum critical distance is not reached, emits a collision warning, and wherein the at least one distance sensor is devised and arranged such that with it, deflection can be determined at every possible rotational position of the gondola during operation as a result of rotation of the gondola around the longitudinal axis of the tower.

9. The device according to claim 8, wherein a calculation routine is programmed into the electronic evaluation system which calculates an actual distance of the distal end of the rotor blade from the tower using the measured distance data from the at least one distance sensor.

10. The device according to claim 8, wherein a wireless data connection is established between the at least one distance sensor and the electronic evaluation system.

11. The device according to claim 8, wherein the electronic evaluation system is connected to an emergency shut-off system, wherein when the collision warning is emitted, the electronic evaluation system activates the emergency shut-off system.

12. The method according to claim 4, wherein the contactless distance measurement is taken optically using laser light.

13. The method according to claim 1, wherein to analyze the degree of aging of the rotor blade, current weather data such as temperature and atmospheric humidity, are taken into consideration along with the distance determined by means of the contactless distance measurement.

14. The method according to claim 1, wherein the deflection of the rotor blade is determined using the distance measurement and mathematical processes.

* * * * *